Patented Mar. 20, 1934

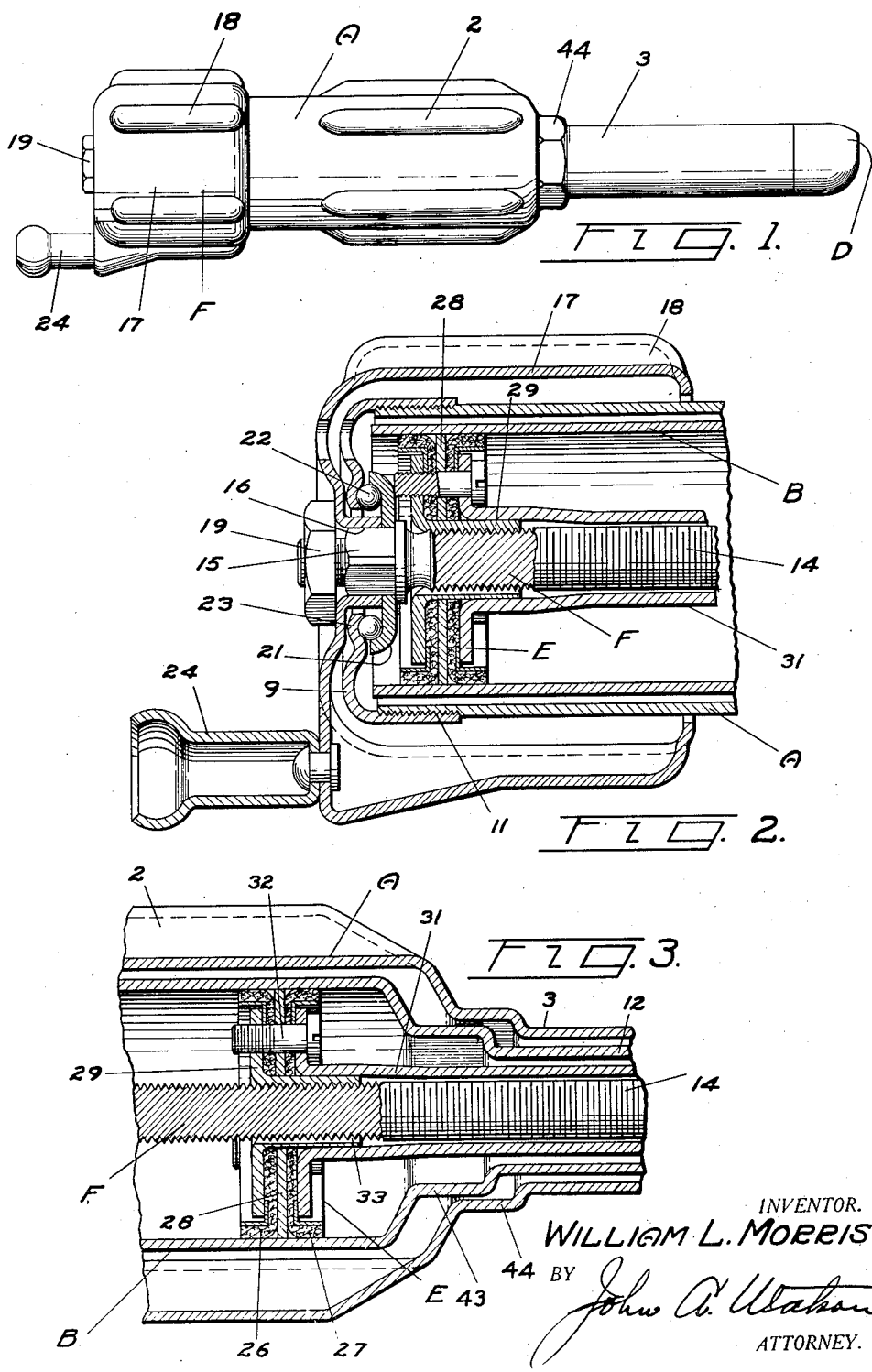

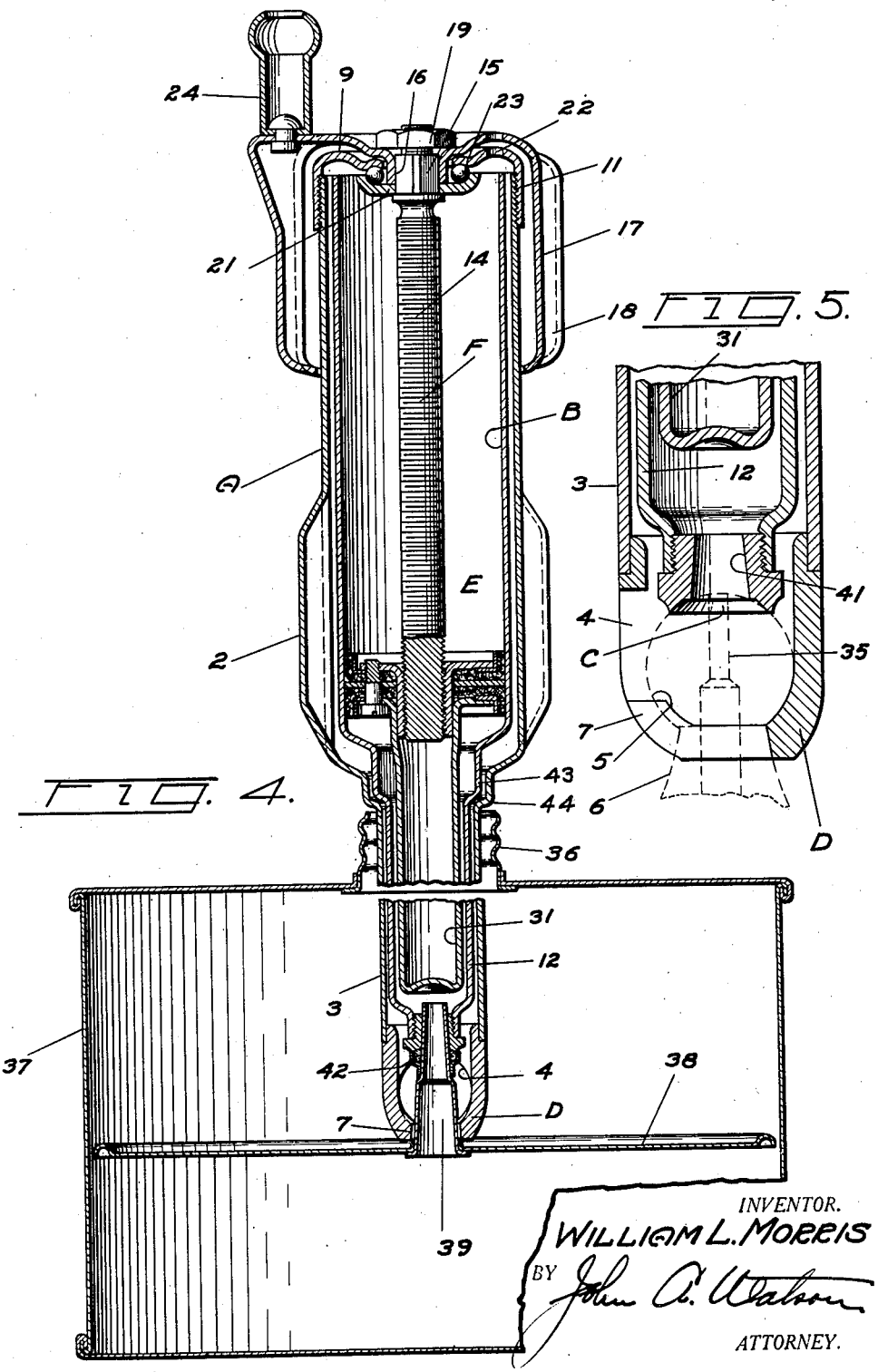

1,951,504

UNITED STATES PATENT OFFICE 1,951,504

LUBRICATING DEVICE

William L. Morris, Wilmette, Ill., assignor to The Lubrication Corporation, South Bend, Ind., a corporation of Delaware Application April 1, 1932, Serial No. 602,507

16 Claims. (Cl. 221—47.4)

This invention relates to lubrication devices and more particularly to hand type lubricant feeder guns incorporating means for clamping the lubricant discharge nozzle of the gun to a lubrication nipple or fitting during the feeding of lubricant thereto.

An object of the invention is to provide an improved hand type lubricant feeder gun.

Another object is to provide a hand type lubricant gun wherein lubricant pressure created therein acts through suitable mechanism to clamp the discharge orifice of the gun tightly to the fitting during the feeding of lubricant thereto.

Another object is to provide a lubricant feeder gun wherein lubricant may not escape between the surfaces of engagement of the gun and lubrication nipple while attaching or detaching the gun to the nipple due to the fact that pressure cannot be placed upon the lubricant until after relatively tight engagement between the discharge nozzle and the nipple is carried out, and such engagement may not be destroyed until the lubricant pressure is relieved.

Another object is to provide a lubricant feeder gun of the character described wherein the discharge of lubricant takes place during the movement of the piston in one direction and wherein the replenishment of lubricant in the gun may be carried out during the return movement of the piston thus minimizing manual effort in the operation and maintenance of the gun during use.

Another object is to provide a hand type lubricant gun of the type wherein the pressure piston is advanced or retracted by the rotation of a screw extending entirely through the piston and in which novel means is employed for preventing the escape of lubricant or release of lubricant pressure through the points of engagement of screw and piston. This advantage is one of importance in that relatively complicated and expensive packing structure need not be employed to effect a lubricant tight seal between the relatively moving parts.

Another object is to provide a hand type lubricant gun of the character described which is capable of delivering lubricant under relatively high pressures, which is compact in form, and which may be economically manufactured.

Other objects, the advantages, and uses of the invention, will be, or should become apparent after reading the following description and claims and after consideration of the accompanying drawings forming a part of this specification in which:

Fig. 1 is a side elevation of a hand type lubricant feeder gun embodying the features of my invention;

Fig. 2 is an enlarged sectional view of the rearward portion of the gun illustrated in Fig. 1;

Fig. 3 is an enlarged sectional view of an intermediate portion of the gun illustrated in Fig. 1;

Fig. 4 is a vertical sectional view illustrating the operation of the gun as during the replenishment of lubricant therein; and Fig. 5 is an enlarged sectional view of the lubricant discharge nozzle and clamping mechanism of the gun as during operative engagement with a lubrication fitting.

In general the hand type lubricant feeder gun selected to illustrate my invention comprises an outer casing or barrel A, a lubricant pressure cylinder or reservoir B having a lubricant discharge orifice C at its outer end, a lubricant nipple engaging clamp member D rigidly fixed to the barrel A, a pressure piston E mounted for reciprocation in the cylinder B and a hand screw mechanism F for manually operating the piston E.

The barrel A has a plurality of longitudinally disposed radially extending ribs 2 formed on its outer intermediate side walls so that the barrel may be manually grasped and held against rotation. The outer end of the barrel comprises an elongated extension 3 of relatively small diameter to which the nipple engaging clamp member D is rigidly fixed. The member D has an opening 4 extending through its side wall of sufficient diameter to permit the introduction of the enlarged head 5 of a lubrication nipple or fitting 6 therethrough as illustrated in dotted lines in Fig. 5. A constricted continuation of the opening 4 extends forwardly and across the forward end wall of the member D as illustrated at 7. The enlarged head 5 of the lubrication nipple may therefore be clamped tightly between the discharge orifice C of the gun and the adjacent walls of the opening 7 of the member D. The gun may be shifted angularly through a relatively wide range with respect to the head 5 of the fitting from that position illustrated in Fig. 5 thus providing universal engagement between the gun and the fitting to facilitate operativeness of the gun in ordinarily inaccessible locations.

The upper end of the barrel A is closed by a cap 9 secured to the barrel by screw threads 11.

The cylinder B is disposed within the barrel A and is capable of limited longitudinal movement with respect thereto. The discharge nozzle C is located at the outer end of an elongated and reduced portion 12 of the cylinder B which extends through the portion 3 of the barrel A.

The clearance between the portions 12 and 3 of the cylinder and barrel respectively is only sufficient to permit relative longitudinal movement. The hand operating screw mechanism F includes an elongated externally threaded screw member 14 the rearward end of which is formed to present right angle side walls 5 which extend through and engage with the central portion 16 of a cap 17. The cap member 17 is formed with ribs 18 similar to the ribs 2 on the barrel A. A lock nut 19 is employed to hold the member 17 in place upon the screw 14. An annular ball raceway 21 is disposed about the rearward end of the screw 14 on the inside of the barrel A and a plurality of bearing balls 22 are engaged with the raceway and a second raceway 23 formed on the adjacent face of the barrel cap 9. The member 17 may thus be easily rotated regardless of the rearward thrust applied to the screw 14. A handle 24, which may be formed of a metal stamping, is secured to the ribbed member 17 for rotating that member as during the replenishment of lubricant in the cylinder B in the manner hereinafter described.

The piston E (see Figs. 2 and 3) comprises a pair of packing cups 26 and 27, which may be of raw hide, disposed on opposite sides of a body plate 28 with their skirted portions extending outwardly therefrom, an internally threaded bushing 29 extending through the piston the threads of which are in engagement with the externally threaded walls of the screw 14 and an elongated sheath 31 disposed on the forward side of the piston E and extending sufficiently ahead of the piston to permit of its rearward movement along the screw 14 to the rearmost end of the cylinder B. A plurality of binder screws 32 are employed to hold the piston assembly together, one of which may be seen in Fig. 3.

The internally threaded wall of the bushing 29 has a groove 33 extending throughout its length so that air may escape from within the sheath 31 as it is displaced by the screw 14 as during the retractile movement of the piston.

In operation the fitting engaging or clamp member D of the gun is placed over the enlarged head 5 of the nipple 6 by entry of the head 5 through the opening 4. The cylinder assembly with its discharge orifice C is at this time retracted upwardly relative to the reduced portion 3 of the barrel A, and the lubricant in the cylinder B is not under pressure.

The operator may next rotate the hand grip member 17 with one hand while holding the gun firmly by manual engagement with the intermediate portion of the barrel A thus causing the screw 14 to rotate and urge the piston E forwardly. Forward movement of the piston creates slight pressure in the cylinder B ahead of the piston to cause the entire cylinder to progress forwardly until the fitting engaging wall of discharge orifice C is engaged tightly with the adjacent surface of the enlarged head of the nipple 6. Not until the wall of the discharge orifice C engages tightly with the head of the fitting may the lubricant in the cylinder B ahead of the piston E be placed under the pressure necessary to discharge lubricant through the discharge orifice C. Continued rotation of the member 17 causes piston movement to build up relatively high pressure for discharging lubricant through the port 35 of the lubrication nipple. When sufficient lubricant has been delivered to the bearing or other part to be lubricated with which the nipple is associated a few turns of the member 17 in the reverse direction will so lower the pressure in the cylinder B ahead of the piston as to cause the cylinder to move with the piston and withdrawing the nipple engaging wall of the discharge orifice C from the head of the lubrication nipple 6. The gun may then be removed from the servicing of other similar lubrication nipples or fittings.

When the lubricant in the cylinder B has been discharged the piston E will lie at the outermost end of the cylinder B. This position of the piston is that required for initial piston movement as in refilling the cylinder.

The replenishment of the lubricant in the cylinder B may be brought about by inserting the elongated portion 3 of the barrel A through the neck 36 of a lubricant container or barrel 37. A follower plate 38 is disposed within the barrel 37 and permitted to lie upon the surface of the lubricant therein so that downward pressure upon the follower 38 may cause lubricant to be extruded through a conical tube 39 disposed centrally of the follower and extending outwardly along the axis of the neck 36. The contour of the tube 39 is such as to engage with the lubricant delivery passage 41 immediately communicating with the discharge orifice C of the cylinder B so as to form a partial lubricant tight seal therewith by surface contact. Means for further effecting a tight seal between the cylinder B and the tube 39 is provided in a soft packing ring 42 disposed about the outer wall of the sleeve 39 and engageable with the walls of the discharge orifice C. With the parts assembled, as shown in Fig. 4, rotation of the member 17 in a counterclockwise direction will cause the elevation of the piston E and a decrease in pressure ahead of the piston so as to draw lubricant up through the tube 39 into the cylinder. During this process the handle 24 may be conveniently used to cause rapid rotation of the member 17 and thus shorten the time required during the filling operation. A slight downward pressure upon the barrel A is all that is needed to maintain a lubricant tight seal between the cylinder B and the tube 39 through which lubricant from beneath the follower may pass and to place the lubricant under the follower under slight pressure.

When the piston E has been elevated to the position shown in Fig. 2 the refilling of the cylinder 13 will have been completed and the gun ready for further servicing of lubrication nipples and fittings as heretofore described. A suitable cap (not shown) may be provided for the threaded neck 36 to close the barrel 37 when not in use.

In order that the cylinder B may not rotate with respect to the barrel A when the screw 14 is rotated and thus permit the piston E to rotate with the screw I have formed both the cylinder and the barrel with hexagonal side walls 43 and 44 adjacent to the inner ends of the elongated portions 12 and 3 respectively. This structure permits the necessary longitudinal movement as between cylinder and barrel but effectively precludes rotative movement of one relative to the other.

It is to be understood that the embodiments of the invention herein set forth are presented for the purpose of illustration only, and various changes may be made without departing from the spirit and the scope of the invention.

I claim:

1. A lubricant feeder gun comprising a barrel having an elongated portion of reduced diameter at its forward end, a lubrication nipple clamp member rigidly supported at the outer end of said elongated barrel portion, a cylinder disposed in said barrel having an elongated portion of reduced diameter extending into the similarly formed portion of said barrel, a nipple engaging discharge orifice formed at the outer end of the said reduced portion of said cylinder adjacent to said clamp member, a screw extending throughout the cylinder excepting that portion of reduced diameter, a substantially frictionless bearing for rotatively mounting said screw upon said barrel, a manually engageable member disposed concentric with and about the upper end of said barrel and secured to said screw, a handle carried by said manually engageable member at a predetermined distance from the axis thereof, a piston in said cylinder having an internally threaded opening therethrough engaged with the threads of said screw, piston packing for establishing a seal between said piston and said cylinder when the piston is moved in either direction and a sheath extending forwardly of said piston for housing that portion of said screw lying ahead of said piston during its course of travel, said sheath being of less diameter than the reduced portion of said cylinder.

2. A lubricant feeder gun comprising a barrel having an elongated portion of reduced diameter at its forward end, a lubrication nipple clamp member rigidly supported at the outer end of said elongated barrel portion, a cylinder disposed in said barrel having an elongated portion of reduced diameter extending into the similarly formed portion of said barrel, a nipple engaging discharge orifice formed at the outer end of the said reduced portion of said cylinder adjacent to said clamp member, a screw extending throughout the cylinder excepting that portion of reduced diameter, a substantially frictionless bearing for rotatively mounting said screw upon said barrel, a manually engageable member disposed concentric with and about the upper end of said barrel and secured to said screw, a piston in said cylinder having an internally threaded opening therethrough engaged with the threads of said screw and piston packing for establishing a seal between said piston and said cylinder when the piston is moved in either direction.

3. A lubricant feeder gun comprising a barrel, a lubrication nipple clamp member rigidly supported at the outer end of said barrel portion, a cylinder disposed in said barrel having a portion of reduced diameter extending into the similarly formed portion of said barrel, a nipple engaging discharge orifice formed at the outer end of the said reduced portion of said cylinder adjacent to said clamp member, a screw extending throughout the cylinder excepting that portion of reduced diameter, a substantially frictionless bearing for rotatively mounting said screw upon said barrel, a manually engageable member disposed concentric with and about the upper end of said barrel and secured to said screw, a piston in said cylinder having an internally threaded opening therethrough engaged with the threads of said screw, piston packing for establishing a seal between said piston and said cylinder when the piston is moved in either direction and a sheath extending forwardly of said piston for housing that portion of said screw lying ahead of said piston during its course of travel, said sheath being of less diameter than the reduced portion of said cylinder.

4. A lubricant feeder gun comprising a barrel, a clamp member rigidly fixed to the barrel for engaging with a lubrication nipple, a cylinder disposed within said barrel having a diametrically reduced portion extending forwardly adjacent to said clamp member and formed to provide a lubricant discharge outlet, a screw extending centrally through said barrel and rotatably mounted upon the barrel at its rearward end, a manually engageable member disposed concentric with and about the rearward end of said barrel and secured to said screw, a piston on said cylinder having an internally threaded opening therethrough engaged with said screw, a piston packing for establishing a seal between said piston and said cylinder, and a sheath extending forwardly of said piston for housing that portion of said screw lying ahead of said piston during its course of travel and arranged to occupy said diametrically reduced forwardly extending portion of said cylinder when said piston is at the inner end of its stroke.

5. A lubricant feeder gun comprising a barrel, a clamp member rigidly fixed to the barrel for engaging with a lubrication nipple, a cylinder disposed within said barrel and mounted for longitudinal movement within the barrel having a diametrically reduced portion extending forwardly adjacent to said clamp member and formed to provide a lubricant discharge outlet, a screw extending centrally through said barrel and rotatably mounted upon the barrel at its rearward end, a manually engageable member disposed concentric with and about the rearward end of said barrel and secured to said screw, a piston on said cylinder having an internally threaded opening therethrough engaged with said screw, piston packing for establishing a seal between said piston and said cylinder, and a sheath extending forwardly of said piston for housing that portion of said screw lying ahead of said piston during its course of travel and arranged to occupy said diametrically reduced forwardly extending portion of said cylinder when said piston is at the inner end of its stroke.

6. A lubricant feeder gun comprising a barrel, a clamp member rigidly fixed to the barrel for engaging with a lubrication nipple, a cylinder disposed within said barrel and mounted for longitudinal movement within the barrel having a diametrically reduced portion extending forwardly adjacent to said clamp member and formed to provide a lubricant discharge outlet, a screw extending centrally through said barrel and rotatably mounted upon the barrel at its rearward end, a manually engageable member disposed concentric with and about the rearward end of said barrel and secured to said screw, a piston on said cylinder having an internally threaded opening therethrough engaged with said screw, piston packing for establishing a seal between said piston and said cylinder when the piston is moved in either direction, and a sheath extending forwardly of said piston for housing that portion of said screw lying ahead of said piston during its course of travel and arranged to occupy said diametrically reduced forwardly extending portion of said cylinder when said piston is at the inner end of its stroke.

7. A lubricant feeder gun comprising a barrel, a clamp member rigidly fixed to the barrel for engaging with a lubrication nipple, a cylinder disposed within said barrel and mounted for longitudinal movement within the barrel having a diametrically reduced portion extending forwardly adjacent to said clamp member and formed to provide a lubricant discharge outlet, a screw extending centrally through said barrel and rotatably mounted upon the barrel at its rearward end, a manually engageable member disposed concentric with and about the rearward end of said barrel and secured to said screw, a handle disposed on said manually engageable member at a predetermined distance from the axis thereof, a piston on said cylinder having an internally threaded opening therethrough engaged with said screw, a piston packing for establishing a seal between said piston and said cylinder when the piston is moved in either direction, and a sheath extending forwardly of said piston for housing that portion of said screw lying ahead of said piston during its course of travel and arranged to occupy said diametrically reduced forwardly extending portion of said cylinder when said piston is at the inner end of its stroke.

8. In a lubricant feeder gun, a cylinder having a diametrically reduced forwardly extending portion terminating in a lubricant outlet, a screw mounted for rotation within said cylinder, a piston in said cylinder having an internally threaded opening therethrough engageable with the threads of said screw and a sheath secured to said piston and extending along the axis thereof for housing that portion of said screw extending beyond the piston as during piston travel and arranged to occupy said forwardly extending reduced portion of said cylinder when the piston is at the inner end of its stroke.

9. In a lubricant feeder gun, a cylinder having a diametrically reduced forwardly extending portion terminating in a lubricant outlet, a screw mounted for rotation within said cylinder, a piston in said cylinder having an internally threaded opening therethrough engageable with the threads of said screw and a sheath secured to said piston extending along the axis thereof for housing that portion of said screw extending beyond the piston as during piston travel and arranged to occupy said forwardly extending reduced portion of said cylinder when the piston is at the inner end of its stroke and piston packing for establishing a seal between the piston walls and said cylinder when the piston is moved in either direction.

10. In a lubricant feeder gun, a cylinder, a screw mounted for rotation within said cylinder, a piston in said cylinder having an internally threaded opening therethrough engageable with the threads of said screw and a sheath secured to said piston and extending along the axis thereof for housing that portion of said screw extending beyond the piston as during piston travel, said piston having a bleed opening therethrough establishing communication between the interior of said sheath and the opposed side of said piston whereby air displaced by said screw may escape therethrough.

11. In a lubricant feeder gun, a barrel, a clamping member secured to the outer end of said barrel for engagement to a lubrication fitting, a cylinder disposed within said barrel and provided with a lubricant discharge orifice at its outer end having uniform side walls and formed with its mouth lying in a plane transverse with the axis of said cylinder and said barrel, said clamping member being formed with a portion about the axis of the discharge orifice cut away and means for forcing lubricant out of said cylinder through said discharge orifice and for drawing lubricant into said cylinder through said discharge orifice along said axis at will.

12. In a lubricant feeder gun, a barrel, a clamping member disposed at the outer end of said barrel for engagement with a lubrication fitting, a cylinder slidably mounted within said barrel and provided with a lubricant discharge orifice at its outer end having its mouth lying in a plane transverse to the axis of said cylinder and said barrel, means for causing relative movement between said cylinder and said barrel to clamp a lubrication fitting between said clamping member and said discharge orifice and means including said last named means for discharging lubricant from said cylinder through said discharge orifice or for drawing lubricant through said discharge orifice along the axis of said barrel into said cylinder at will.

13. A lubricant gun comprising a barrel having a tubular extension, a lubricant cylinder within the barrel having a nozzle slidable within the extension, a piston within the cylinder, said extension of said barrel and said nozzle forming a clamp to engage with and clamp said nozzle to a lubricant nipple or the like.

14. A lubricant gun comprising a barrel having a tubular extension, a lubricant cylinder slidable within said barrel and having a nozzle located within said extension, a piston within the cylinder, and means supported upon said barrel for moving the piston within said cylinder, said extension and said nozzle forming a clamp operable by actuation of said piston to clamp said nozzle upon a lubricant nipple.

15. A lubricant gun comprising a pair of nested similar hollow members having tubular extensions, and means for compressing lubricant in the inner of said members, the inner of said extensions having a lubricant discharge orifice and the other being formed to engage with and clamp a lubricant nipple to said discharge orifice upon relative movement between said members.

16. A lubricant gun comprising a barrel formed with a clamp member at one end for engagement with a lubricant nipple, a cylinder within said barrel having a discharge orifice in registration with said clamping member, means associated with said barrel and said cylinder for causing relative right line movement between said barrel and said cylinder to clamp said nipple to said discharge orifice and to discharge lubricant through said discharge orifice and means for precluding relative rotation between said barrel and said cylinder whereby said discharge orifice may bear a predetermined relationship relative to said clamping member.

WILLIAM L. MORRIS.